(12) United States Patent
Lin

(10) Patent No.: US 9,089,848 B2
(45) Date of Patent: Jul. 28, 2015

(54) SWITCHING DEVICE FOR AIR PURIFIER

(71) Applicant: TSUNG SHIN INTERNATIONAL CO., LTD., New Taipei (TW)

(72) Inventor: Tsung-Hui Lin, New Taipei (TW)

(73) Assignee: Tsung Shin International Co., Ltd., New Taipei (TW)

( * ) Notice: Subject to any disclaimer, the term of this patent is extended or adjusted under 35 U.S.C. 154(b) by 5 days.

(21) Appl. No.: 14/064,206

(22) Filed: Oct. 28, 2013

(65) Prior Publication Data
US 2015/0022934 A1    Jan. 22, 2015

(30) Foreign Application Priority Data
Jul. 19, 2013    (TW) .............................. 102213659 U

(51) Int. Cl.
     *B03C 3/38*     (2006.01)
     *B01D 53/32*    (2006.01)
     *B03C 3/68*     (2006.01)
     *F24F 3/16*     (2006.01)

(52) U.S. Cl.
     CPC ................ *B03C 3/383* (2013.01); *B01D 53/32* (2013.01); *B03C 3/38* (2013.01); *B03C 3/68* (2013.01); *F24F 3/166* (2013.01)

(58) Field of Classification Search
CPC ...... H05F 3/06; A61L 9/18; F24F 2003/1682; F24F 3/166; B03C 3/38; B03C 3/68; B03C 3/383; B01D 53/32
See application file for complete search history.

(56) References Cited

U.S. PATENT DOCUMENTS 4,376,642 A *   3/1983   Verity ............................. 96/58
4,901,194 A *   2/1990   Steinman et al. ............ 361/213
6,675,780 B1 *   1/2004   Wendels et al. .............. 123/536

* cited by examiner

*Primary Examiner* — Zeev V Kitov
(74) *Attorney, Agent, or Firm* — Leong C. Lei

(57) ABSTRACT

The switching device for an air purifier contains a circuit board, a timing and switching module, a manual switch, a fan module, a positive and negative ion production module, and a negative ion production module. The timing and switching module is configured on the circuit board, and the fan module is electrically connected to the circuit board. The two ion production modules are electrically connected to the timing and switching module and the manual switch. Under an automatic mode, the two ion production modules are activated alternately whereas, under a manual mode, the positive and negative ion production module is activated alone, thereby achieving greater flexibility.

5 Claims, 6 Drawing Sheets

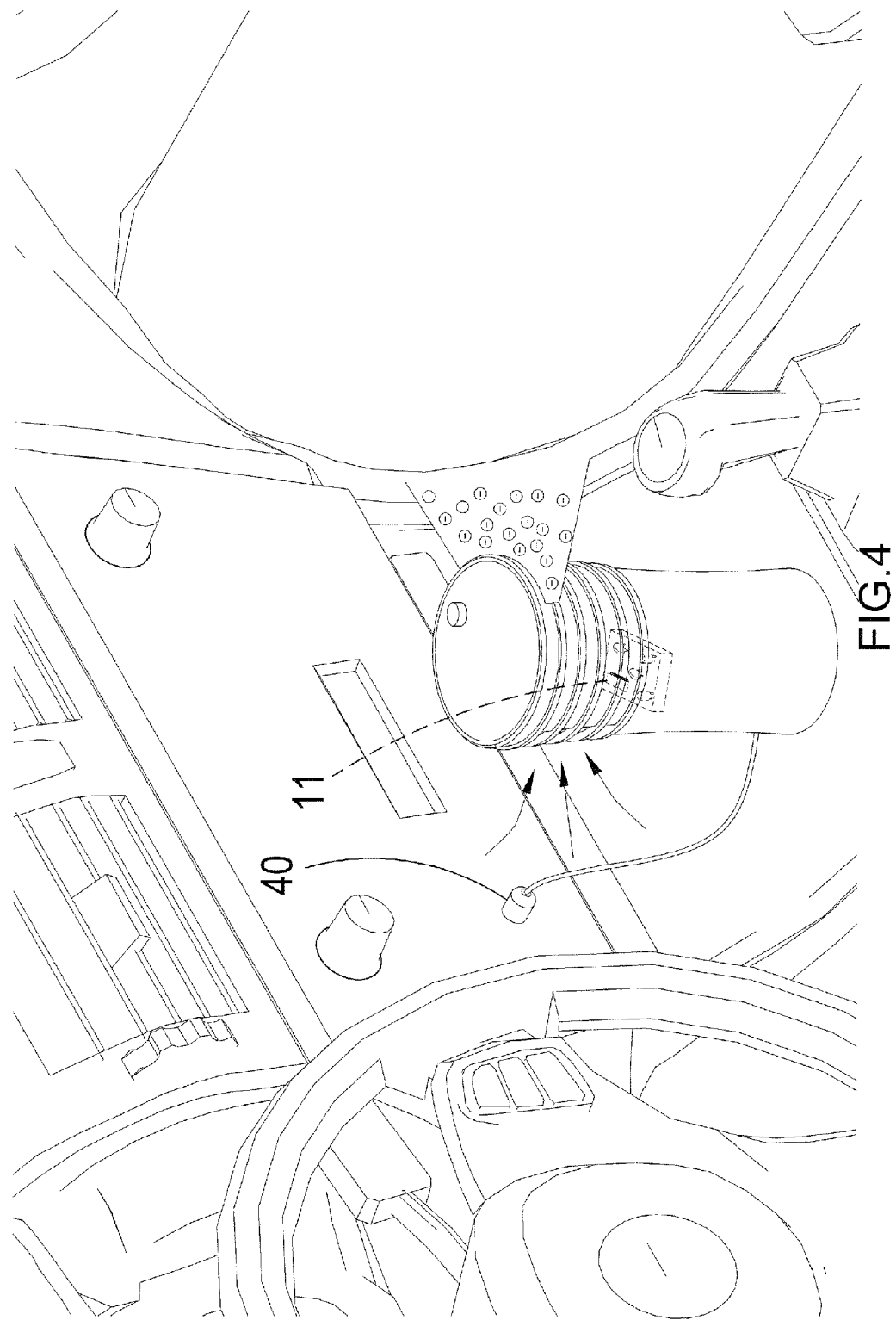

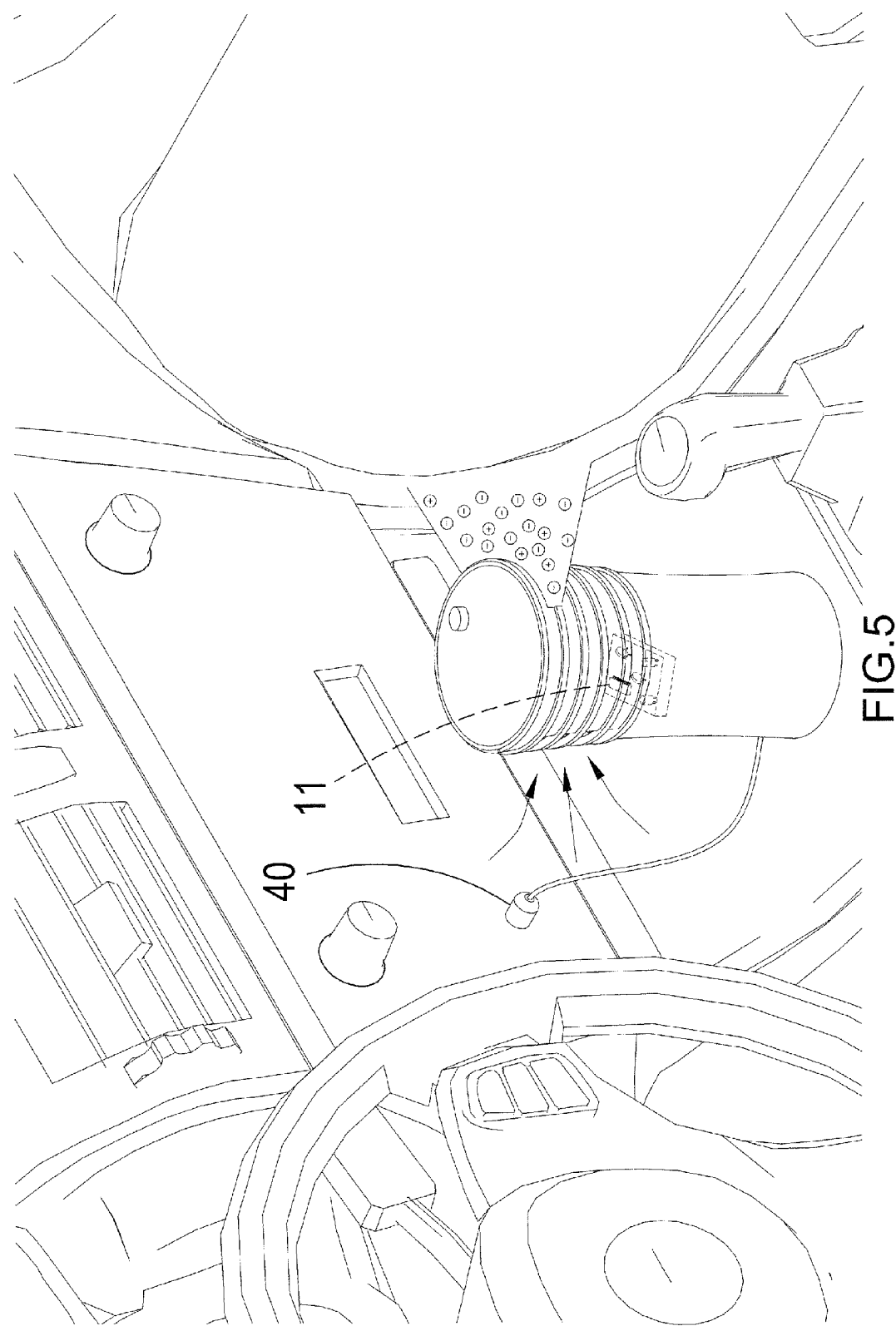

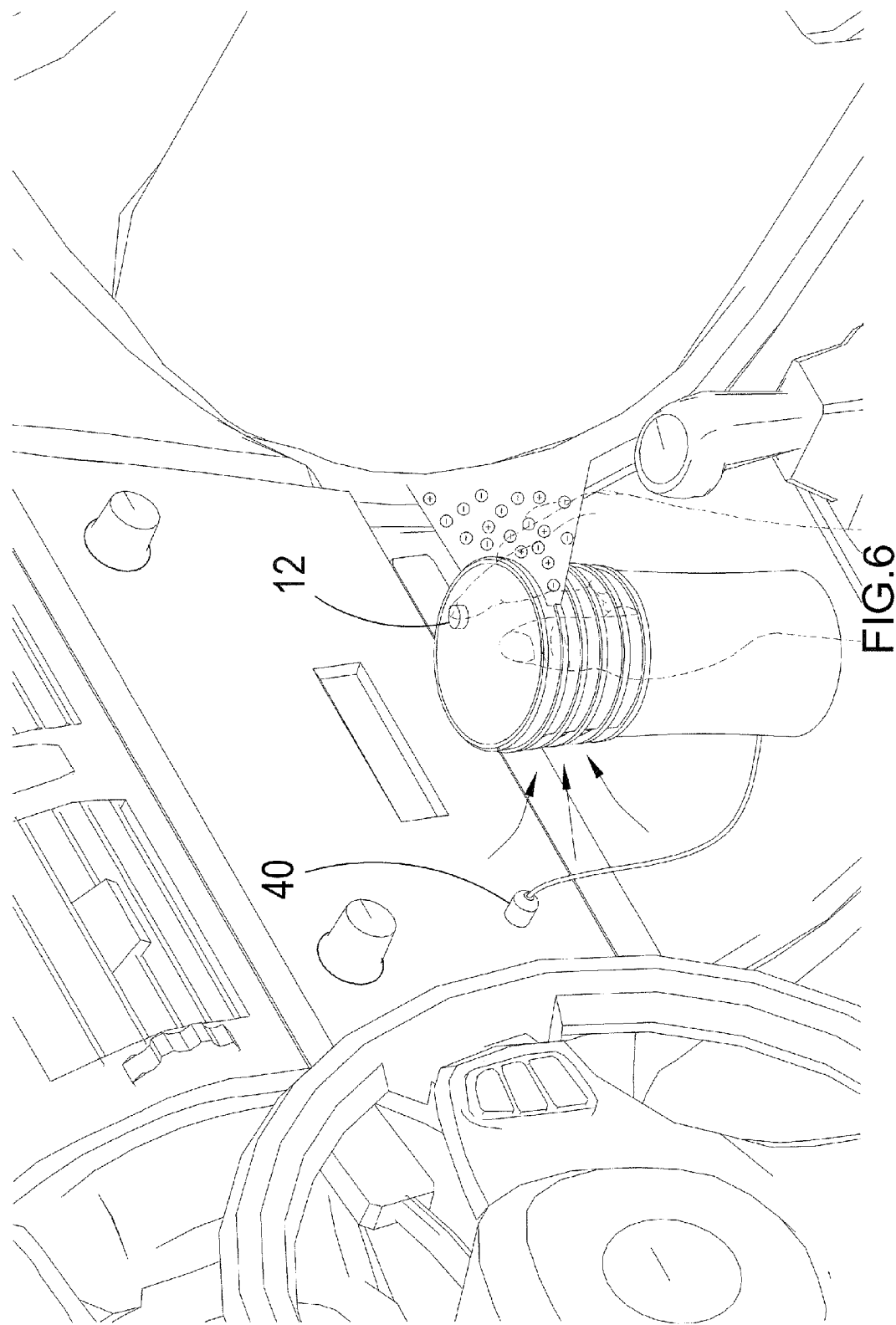

SWITCHING DEVICE FOR AIR PURIFIER

TECHNICAL FIELD OF THE INVENTION

The present invention is generally related to air purifiers, and more particular to a switching device for operating an air purifier either in an automatic mode or in a manual mode.

DESCRIPTION OF THE PRIOR ART

An air purifier removes contaminants from the air, and is considered beneficial to allergy sufferers and asthmatics.

A conventional air purifier usually produces a single type of ions, such as the negative ions, to the air so as to improve the air quality. However, too many negative ions are not always beneficial. Recently, there are air purifiers producing both positive and negative ions to achieve a balance among the positive and negative ions. They usually rely on a sensor to detect the state of the air and switch the production of positive and negative ions. These air purifiers function satisfactorily when operating in a closed space. However, if the air is constantly disturbed, these air purifiers often continuously produce a single type of ions, thereby stressing the parts producing the specific ions and shortening the life span.

Additionally, the switching between the production of the positive and negative ions is automatic for the conventional air purifiers. In other words, a user has no control over the type of ions being produced.

SUMMARY OF THE INVENTION

Therefore, to obviate the shortcomings of the conventional air purifier, a novel switching device for an air purifier is provided herein.

A major objective of the present invention is to provide an automatic mode and a manual mode to the operation of an air purifier so that the production of ions can be either automated or manually controlled by a user. As such, the drawbacks of conventional air purifiers such as the single mode of operation, wrongful detection in disturbed air, lack of manual control, etc., can all be resolved.

To achieve the objective, the switching device for an air purifier contains a circuit board, a timing and switching module configured on the circuit board, and a manual switch and a fan module electrically connected to the circuit board. The timing and switching module and the manual switch are electrically connected to a positive and negative ion production module, and a negative ion production module.

Through the above structure, the timing and switching module activates the two ion production modules alternately under an automatic mode so that a balanced production of ions is achieved. On the other hand, through the manual switch, the positive and negative production module can be activated alone manually, thereby achieving greater flexibility and convenience to the user.

The foregoing objectives and summary provide only a brief introduction to the present invention. To fully appreciate these and other objects of the present invention as well as the invention itself, all of which will become apparent to those skilled in the art, the following detailed description of the invention and the claims should be read in conjunction with the accompanying drawings. Throughout the specification and drawings identical reference numerals refer to identical or similar parts.

Many other advantages and features of the present invention will become apparent to those versed in the art upon making reference to the detailed description and the accompanying sheets of drawings in which a preferred structural embodiment incorporating the principles of the present invention is shown by way of illustrative example.

BRIEF DESCRIPTION OF THE DRAWINGS

FIG. 4 shows a scenario of the switching device of FIG. 1 when operating under an automatic mode to produce negative ions.

FIG. 5 shows a scenario of the switching device of FIG. 1 when operating under an automatic mode to produce both positive and negative ions.

FIG. 6 shows a scenario of the switching device of FIG. 1 when operating under a manual mode to produce both positive and negative ions.

DETAILED DESCRIPTION OF THE PREFERRED EMBODIMENTS

The following descriptions are exemplary embodiments only, and are not intended to limit the scope, applicability or configuration of the invention in any way. Rather, the following description provides a convenient illustration for implementing exemplary embodiments of the invention. Various changes to the described embodiments may be made in the function and arrangement of the elements described without departing from the scope of the invention as set forth in the appended claims.

Figure 1:
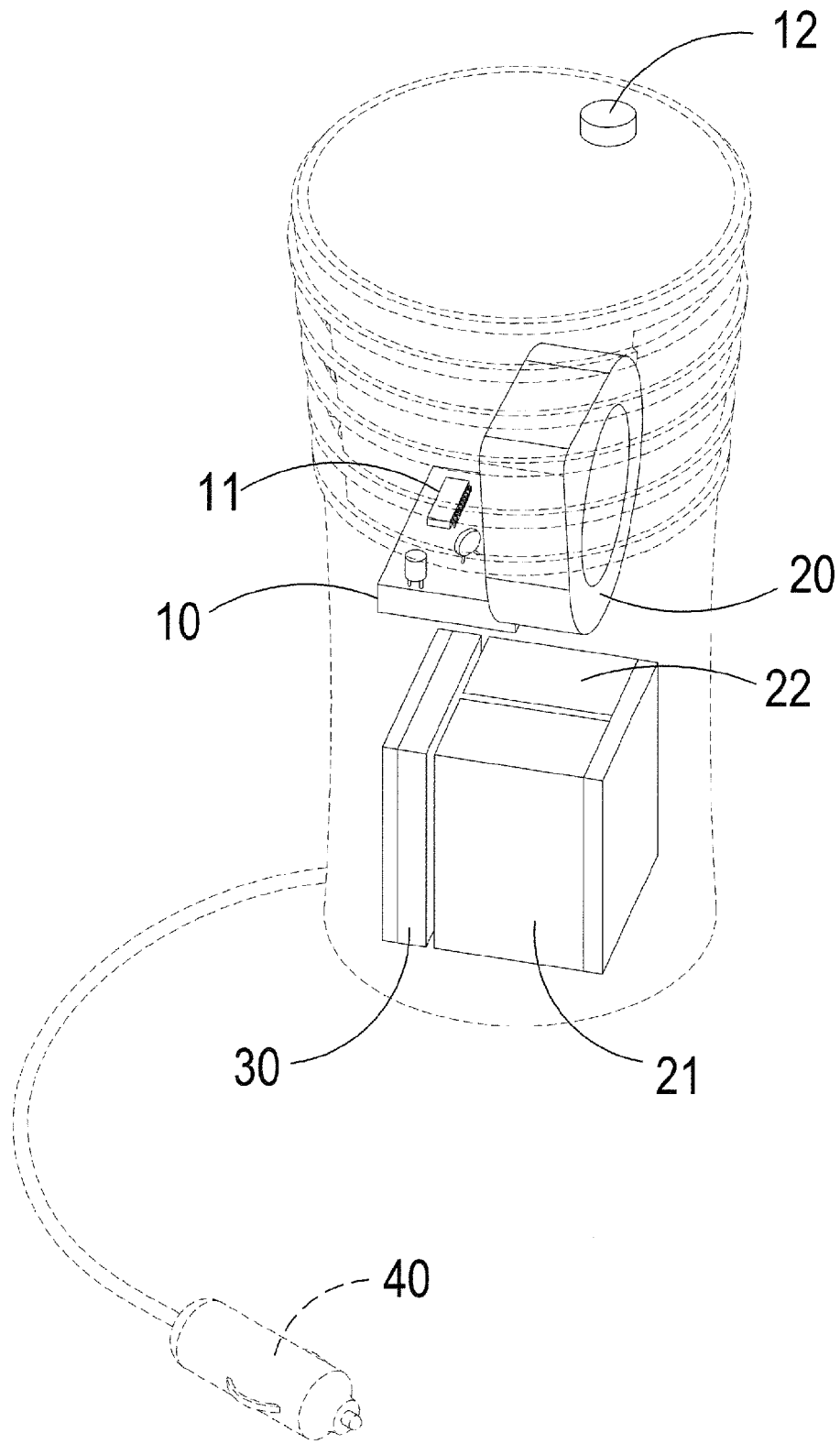
FIG. 1 is a perspective diagram showing the various components of a switching device for an air purifier according to an embodiment of the present invention.
Figure 2:
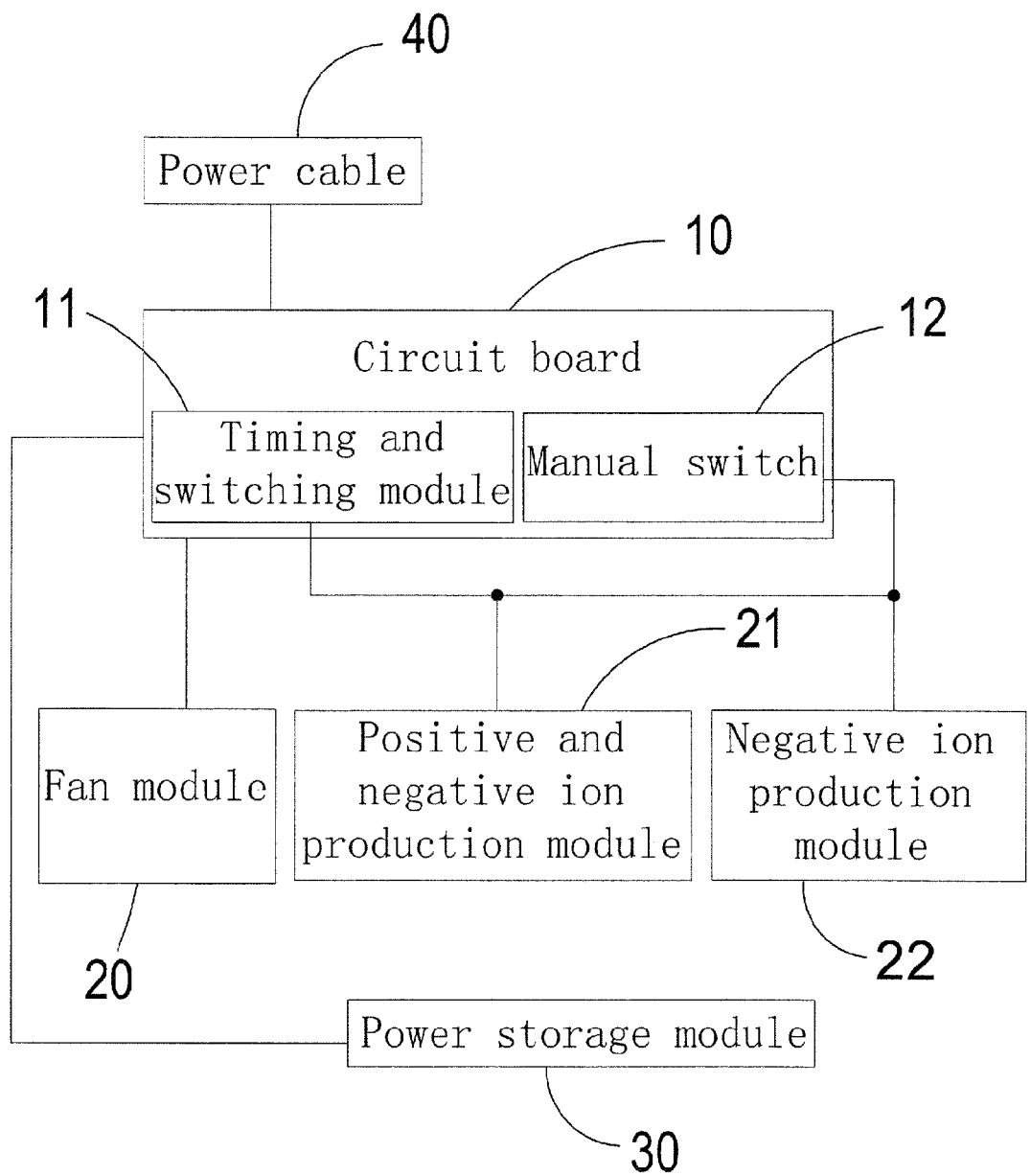
FIG. 2 is a schematic functional diagram showing the connection among the various components of the switching device of FIG. 1.

As illustrated in FIGS. 1 and 2, a switching device for an air purifier according to an embodiment of the present invention contains a circuit board 10, a timing and switching module 11 configured on the circuit board 10, a manual switch 12 electrically connected to the circuit board 10, a fan module 20 electrically connected to the circuit board 10, a positive and negative ion production module 21 electrically connected to the timing and switching module 11 and the manual switch 12, a negative ion production module 22 electrically connected to the timing and switching module 11 and the manual switch 12, a power storage module 30 electrically connected to the circuit board 10 providing the required electricity for the foregoing components to operate, and a power cable 40 electrically connected to the circuit board 10.

Figure 3:
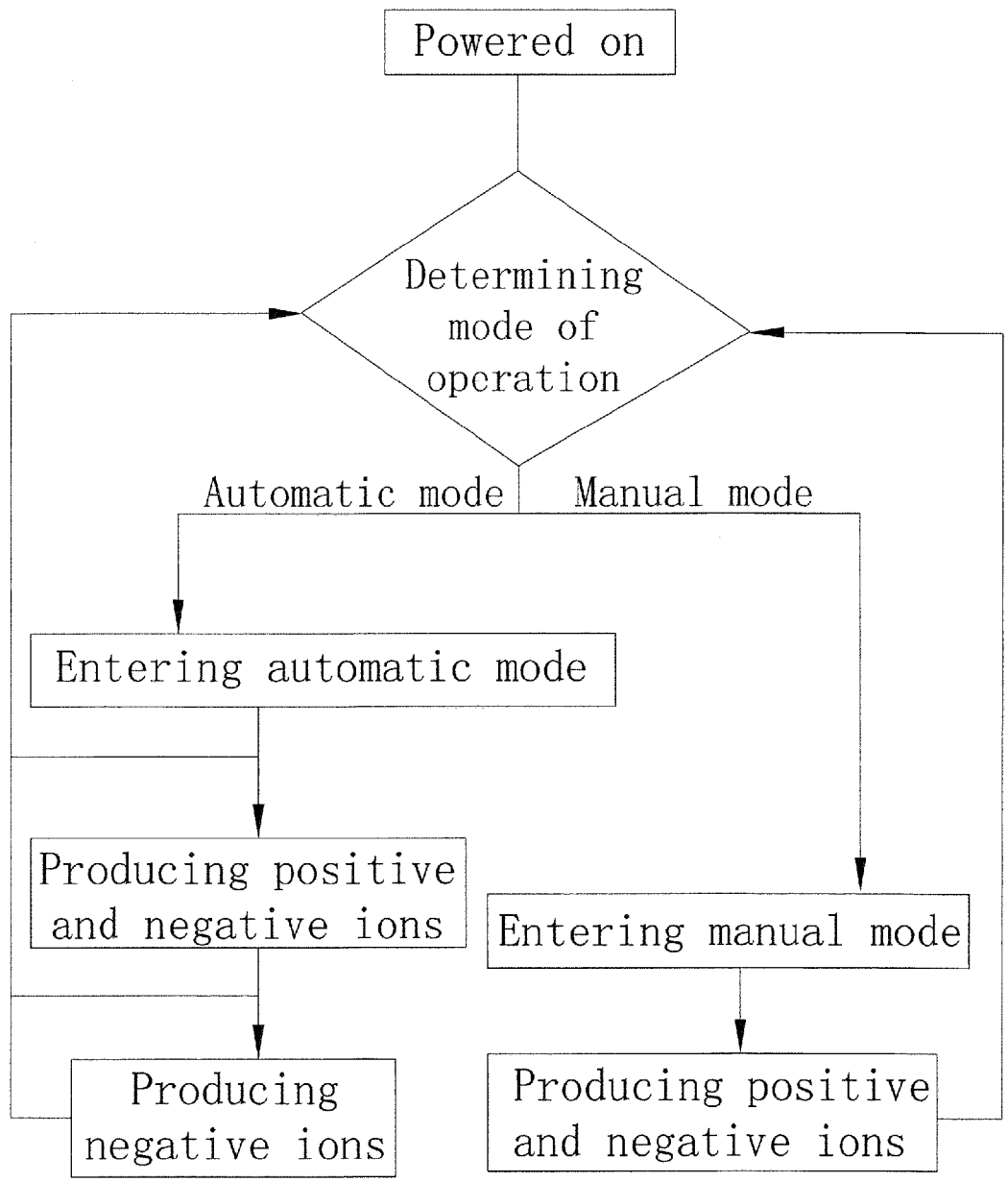
FIG. 3 is a flow diagram showing the operation of the switching device of FIG. 1.

In the present embodiment, the air purifier is a portable one and the fan module 20 is basically a blower, which are all exemplary and are not limited as such. As illustrated in FIG. 3, the switching device operates as follows. When the circuit board 10 is powered on, the state of the manual switch 12 set by a user determines the switching device's operation in one of an automatic mode and a manual mode. If the manual switch 12 is set to the automatic mode, or when the circuit board 10 is already running under the manual mode, the timing and switching device 11 activates the negative ion production module 22 and the positive and negative ion production module 21 alternately. For example, as shown in FIG. 4, the negative ion production module 22 is activated to produce negative ions whereas, as shown in FIG. 5, the negative ion production module 22 is deactivated and the positive and negative ion production module 21 is activated to produce both positive and negative ions. Under this automatic mode, the timing and switching module 11 can be configured so that the alternation between the two ion production modules 21 and 22 is conducted in either a balanced or an imbalanced manner. For the balanced manner, the two ion production modules are activated for a same period of time. For example, the positive and negative ion production module 21 is activated for 10 minutes, the negative ion production module 22 is then activated for 10 minutes, and the process is repeated until the circuit board 10 is turned off, or until the manual switch 12 is set to the manual mode. For the imbalanced manner, the two ion production modules are activated for different periods of time. For example, the positive and negative ion production module 21 is activated for 10 minutes, the negative ion production module 22 is then activated for 5 minutes, and so on. On the other hand, if the manual switch 12 is set to the manual mode when the circuit board 10 is power on, or when the circuit board 10 is already running under the automatic mode, the positive and negative ion production module 21 is immediately activated and the negative ion production module 22 is immediately deactivated. As such, the positive and negative ion production module 21 continuously produces positive and negative ions, as shown in FIG. 6, until the circuit board 10 is turned off, or until the manual switch 12 is set to the automatic mode. In the above scenarios, the fan module 20 drives the produced ions to the surrounding air so as to improve the quality of the air. The switching device can be powered by the power storage module 30, or by an external power source through the power cable 40. The power storage module 30 can be a replaceable and rechargeable battery, and is charged by the external power source when the power cable 40 is connected to the external power source. The switching device therefore can be operated where no external power source is available.

The advantages of the present invention are as follows.

With the timing and switching module 11 and the manual switch 12, the two ion production modules 21 and 22 are activated alternately, or the positive and negative ion production module 21 is activated alone, thereby achieving greater flexibility. In addition, with the replaceable power storage module 30, superior portability is achieved.

While certain novel features of this invention have been shown and described and are pointed out in the annexed claim, it is not intended to be limited to the details above, since it will be understood that various omissions, modifications, substitutions and changes in the forms and details of the device illustrated and in its operation can be made by those skilled in the art without departing in any way from the spirit of the present invention.

I claim:

1. A switching device for an air purifier comprising:
a circuit board;
a timing and switching module configured on the circuit board;
a manual switch electrically connected to the circuit board that sets the switching device to operate in one of an automatic mode and a manual mode;
a fan module electrically connected to the circuit board;
a positive and negative ion production module electrically connected to the timing and switching module and the manual switch; and
a negative ion production module electrically connected to the timing and switching module and the manual switch;
wherein, under the automatic mode, the timing and switching device repeatedly and alternately activates the negative ion production module and the positive and negative ion production module; and, under the manual mode, the positive and negative ion production module is activated and the negative ion production module is deactivated.

2. The switching device for an air purifier according to claim 1, further comprising a power storage module electrically connected to the circuit board.

3. The switching device for an air purifier according to claim 2, wherein the power storage module is replaceable.

4. The switching device for an air purifier according to claim 1, further comprising a power cable electrically connected to the circuit board.

5. The switching device for an air purifier according to claim 1, wherein the fan module is a blower.

* * * * *